United States Patent Office 3,326,866
Patented June 20, 1967

3,326,866
SULFONATED RESIN CATALYST WITH ENHANCED ACTIVITY
Werner O. Haag, Cherry Hill, N.J., assignor to Mobil Oil Corporation, a corporation of New York
No Drawing. Filed June 10, 1963, Ser. No. 286,476
6 Claims. (Cl. 260—79.3)

This invention relates to catalytic reactions involving olefins. It is more particularly concerned with sulfonated organic resin catalysts having enhanced activity.

In copending application Serial Number 127,841, filed July 31, 1961, now abandoned, there was disclosed a class of sulfonated organic resin catalysts that exhibited a high degree of activity in anhydrous reactions involving olefins. Such reactions include, alkylation, polymerization, isomerization, and the like. Among other characteristics common to this class of catalysts were (1) an accessible volume of at least 0.05 cubic centimeter, or (2) a dry pore volume of at least 0.05 cubic centimeter, and (3) an activity to produce cumene from benzene and propylene at 75–78° C. at the rate of between about one and about 10 millimoles cumene per gram of catalyst per hour.

The anhydrous reactions involving olefins are acid-catalyzed reactions. With sulfonated resin catalysts the acid catalytic sites are the sulfonic acid groups. The ability of a sulfonated resin to catalyze a reaction, i.e., its activity, however, depends upon the availability and accessibility of the acid sites. The conventional sulfonated organic ion exchange resins are substantially non-porous, glass-like materials. Hence, they have very little activity in the anhydrous reactions. In the case of Serial Number 127,841, the catalysts are sulfonated coal and certain sulfonated organic resins, all of which have accessible pores. Accordingly, more acid sites become available to catalyze anhydrous reactions involving olefin and the catalyst has high activity. It will be appreciated, however, that the activity can be further increased, if the accessibility of acid catalytic sites is greater.

There have now been found porous sulfonated resin catalysts having increased accessibility of acid catalytic sites and enhanced activity.

Accordingly, it is a broad object of this invention to provide novel sulfonated organic resin catalysts. Another object is to provide porous sulfonated resin catalysts having increased accessibility of acid catalytic sites and enhanced activity. A further object is to provide a method for enhancing the activity of porous sulfonated resin catalysts. Other objects and advantages of this invention will become apparent to those skilled in the art, from the following detailed description.

The present invention provides a porous sulfonated organic resin catalyst treated to increase accessibility of acid catalytic sites and having activity to produce more than 10 millimoles cumene per hour per 5 milliequivalents hydrogen ion from benzene and propylene at 75–78° C. and at atmospheric pressure. It also provides a method for enhancing the activity of a porous sulfonated organic resin catalyst that comprises replacing part of the acid hydrogen sites with non-polar organic radicals; and utilizing the catalyst of enhanced activity, thus produced, in hydrocarbon conversion reactions.

In order to produce the porous sulfonated organic resin catalysts of this invention, porous sulfonated organic resins are further treated to increase the accessibility of the acid catalystic sites, thus enhancing activity. Typical porous resins that can be thus treated are described in copending application Serial Number 127,841 and in United States Letters Patent No. 3,037,052. Two types of resins described in Serial Number 127,841 are the "popcorn" resins and porous resins prepared in solvents.

*Popcorn resins*

One type of resin catalyst improved by this invention is the sulfonated proliferous polymer derived from vinyl monomers that has a porous, popcorn-like appearance. Such polymers have a particle density, before sulfonation, very close to, or even less than, that of the vinyl monomer. In contrast, the conventional glass-like polymers increase in particle density during polymerization.

Many vinyl compounds have been found to form popcorn polymers. They include styrene (Staudinger and Husemann, Ber. 68B, 1618 (1935)), dimethylbutadiene (Kondakow, J. Prakt. Chem. 62, 166 (1900); 64, 109 (1901)); chloroprene (Carothers, J. Am. Chem. Soc. 53, 4214 (1931)), butadiene (Welch, Ind. Eng. Chem., 39, 826 (1947)), methyl acrylate, vinyl acetate (Breitenbach et al., Monatsh, 80, 150 (1950)), acrylic acid (Bodamer, U.S. Pat. 2,597,437 issued May 20, 1952), vinyl pyridine (U.S. Pat. 2,899,396, issued Aug. 11, 1959) etc.

A wide variety of polyolefinic compounds definitely assist in the formation of popcorn polymers. These compounds have been referred to as "popping agents"; examples of these include divinylbenzene, butadiene, isoprene, dimethylallyl ether, diallyl maleate, diallyldimethylsilane, etc. The auxiliary compounds seem to copolymerize with the vinyl monomers.

It has been found that styrene can be proliferously polymerized consistently, and without the formation of glassy polymer, when diallyl maleate is used as the auxiliary compound (popping agent). For this reason, popcorn polymers derived from these reagents are especially preferred. However, the present invention includes all popcorn resins containing sulfonic acid groups. The sulfonic acid group may be directly attached to an aromatic nucleus, or it may be attached to aliphatic groups.

The popcorn resins are readily prepared by reacting the monomer, or mixture of monomer and assisting or "popping" agent, in a reaction vessel at temperatures varying between about 20° C. and about 100° C., preferably between about 70° C. and about 85° C. There is usually an induction period of about 5 hours to about one week within which no visible reaction of the monomer can be detected. Then, polymerization occurs readily at a total time, including the induction period, varying between about 5 hours and about 200 hours. In general, the induction period and the total polymerization time can be materially shortened by seeding the reaction mixture with previously-formed popcorn resin.

After polymerization, the white resin product can be freed of unreacted monomer by washing with an organic solvent, such as an alcohol, e.g., methanol. It has been found, however, that more porous polymers are obtained when the polymer product is extracted with refluxing benzene or xylene for 8 hours to 20 hours, using the Soxhlet extraction technique.

After washing or extraction, the resin product is dried at a temperature varying between about 80° C. and about 130° C. until there is substantially constant weight. Other drying techniques also may be used.

The introduction of sulfonic acid groups into the polymers can be achieved in any desired way. For example, contacting the polymer with gaseous sulfur trioxide or with sulfur trioxide dissolved in a solvent such as chloroform is suitable. Other conventional sulfonating agents such as chlorosulfonic acid or conc. sulfuric acid can be used. The temperature and reaction time depends on the porosity of the polymer, on the particular sulfonating agent, and on the degree of sulfonation which is desired. The best sulfonation conditions can readily be ascertained by making a few trial reactions and determining the degree of sulfonation by titration of the washed product with sodium hydroxide solution. The general procedure for the sulfonation of popcorn resins produced from styrene, to obtain cation-exchange resins, is described in United States Letters Patent No. 2,597,438.

Porous resins from solvents

Another class of sulfonated resin catalyst improved by this invention, is produced by preparing the organic resin in the presence of inert solvents which are readily removed after the polymerization step. Upon removal of the solvent, there is obtained a resin having microporous structure and which, on sulfonation, is a highly active catalyst for anhydrous hydrocarbon conversion reactions.

A very wide range of monomers can be used. Included, for example, are styrene, chlorostyrene, vinylnaphthalene, acetnaphthylene, vinylthiophene, vinylmethyl ether, vinyl acetate, vinylchloride, salts of vinylsulfonic acid, vinylidene chloride, vinyl stearate, acrylic acid, methacrylic acid, methyl acrylate, methyl methacrylate diallyl phthalate, maleic anhydride, diallyl maleate, diethylene glycol maleate, divinylbenzene, butadiene, isoprene and piperylene.

In the present invention, selection of monomers for the polymerization mixture is made so as to incorporate sufficient amounts of a multiple-unnsaturated compoud to adequately crosslink the polymer. Furthermore, the selection of monomer mixtures is restricted to those which are capable of forming a glassy polymer in the absence of inert solvent. For instance, maleic anhydride is not readily copolymerized with butadiene to form a glassy polymer. Hence, such a mixture is not suitable.

The inert solvent can be chosen from among a wide number of compounds. The suitable solvents of this invention include those which form a homogeneous solution with the monomer mixture when one volume of inert solvent is mixed with one volume of the monomers. It is desirable, however, that the solvent be a poor swelling agent for the glassy polymer prepared in the absence of inert solvent.

The selection of inert solvent can be shown more clearly if one considers, for example, a monomer mixture composed of styrene and divinylbenzene in a molar ratio of 92:8. The list of solvents in Table I all are selected so that a homogeneous solution results when one volume of this monomer mix is added to an equal volume of solvent. However, as shown in the table, the volume of different solvents imbibed by the glassy gel produced in the absence of inert solvent vary widely. For the preparation of a microporous 8% cross-linked polystyrene polyelectrolyte, the paraffins and low molecular weight alcohols shown in Table I are preferred solvents. The aromatic benzene and toluene are not suitable.

Table I

| Solvent: | Vol. of solv. imbibed by 100 vols. glassy gel prepared from 92:8 styrene-DVB mix |
|---|---|
| Normal hexane | <10 |
| Normal octane | <10 |
| 2,2,4-trimethylpentane | <10 |
| Benzene | 76 |
| Toluene | 70 |
| n-Butyl alcohol | <10 |
| Tert-butyl alcohol | <10 |
| Acetone | 36 |
| Carbon tetrachloride | <10 |

While the ratio of solvent to monomer mixture can vary widely, it is preferred that at least 50 volumes of solvent be used per 100 volumes of monomer mixture. In the event that 100 volumes of the glassy polymer prepared in the absence of inert solvent is capable of sorbing more than 50 volumes of inert solvent, the volume of inert solvent used should be at least equal to the volume sorbed, and preferably should exceed this volume.

Polymerization of the solvent-monomer mixture can be carried out in several ways. For example, the mixture may be poured into trays, polymerized, and subsequently removed and crushed. Or, a suspension of the mixture may be polymerized to form beads, a technique which is well known. If suspension polymerization is practiced, the suspending medium must be chosen so as not to disrupt unduly the desired monomer: solvent ratio due to mutual solubility. Polymerization initiators such as benzoyl peroxide, azoisobutyronitrile, etc., are added to the monomer mix as required. It is desirable that reaction conditions be chosen to promote rapid polymerization and avoid thereby a premature separation of inert solvent from the polymerizing mass. The preferred monomers for the practice of this invention are styrene and divinylbenzene, with a molar ratio of at least 4% divinylbenzene.

After polymerization, the inert solvent is removed. For this purpose, vacuum distillation, steam distillation or other extractive procedures may be used either at room temperature or at elevated temperature. In any case, the temperature to which the polymer is exposed should be below that temperature at which the glassy polymer begins to show deformation, since exposure above this temperature is likely to cause a sealing off or a collapse of the microporous structure. For example, a polymer made from a 99:1 molar ratio of styrene and divinylbenzene will distort below 100° C., while one made from a molar ratio of 80:20 will remain unaffected. In the former case, the solvent should be removed at a temperature well below 100° C. to avoid loss of the microporous texture.

The sulfonation of the porous resin thus obtained is carried out using conventional methods. Such methods are described herein in the discussion of the preparation of "popcorn" resins.

Treating to enhance activity

An effective method for treating the porous sulfonated organic resin catalysts to enhance activity is to replace part of the hydroxyl (—OH) groups of the sulfonic acid groups of the resin with non-polar groups. The non-polar groups with which the part of the hydroxyl groups are replaced include lower alkoxy groups (containing between 1 and 6 carbon atoms); amido group (—NH$_2$); N-alkyl amido groups, (—NHR), where R is lower alkyl (1–6 carbon atoms); and N,N-dialkyl amido groups, (—NRR′), where R and R′ are lower alkyl (1–6 carbon atoms). Thus, the purpose and object of this invention can be attained by esterifying or amidifying part of the acid sulfo

[(HO)O$_2$S—]

groups in the sulfonated resin catalyst. In general, between about 10 percent and about 80 percent of the sulfo groups in the catalyst can be esterified or amidified, preferably between about 10 percent and about 50 percent, the balance being in the acid, hydrogen form.

The particular method employed for the partial esterification or amidification is not a critical factor. Any of the methods well known in the art can be used. Thus, for example, esterification can be effected by refluxing with an alcohol. Another method for esterification is reaction with a diazo-alkane. Amidification can be accomplished in two steps. First, part of the sulfo groups are converted to the sulfonyl chloride (—SO$_2$Cl) by reaction with phosphorus pentachloride, sulfonyl chloride, or chlorosulfonic acid. Then, the sulfonyl chloride groups are reacted with ammonia or a lower alkylamine to form the sulfonamido group.

Surprisingly, although the total number of catalytic hydrogen sites is reduced, the catalysts of this invention are extremely active. A measure of the activity of a catalyst is its activity for cumene synthesis under standardized conditions. A mixture of 50 cc. benzene and 2.0 grams catalyst is maintained at 75–78° C. as propylene gas is bubbled in at a rate of 50 ml./min., and at atmospheric pressure. The amount of cumene produced is measured and expressed in terms of millimoles per hour per 5 meq. (milliequivalents) of hydrogen. The number of hydrogen sites can be computed from the exchange capacity, determined as described by Kunin, "Ion Exchange Resins" (2nd ed.), John Wiley and Sons, Inc., New York, 1958, on page 341. The use of a yield of cumene based upon unit (5 meq.) hydrogen form acid sulfono groups affords a basis for comparing catalysts having varying percentages of the acid hydrogen blocked, as by esterification.

*Hydrocarbon conversion reactions*

The reactions in which the novel improved catalysts of this invention are useful are hydrocarbon conversion reactions. Particularly preferred, although not limited thereto, are conversion reactions involving olefins. Typical hydrocarbon conversion reactions that are contemplated are:

*Isomerizations.*—Olefinic compounds can undergo double bond shift and skeletal rearrangement in the presence of the above catalysts. Double bond shift occurs very readily at temperatures slightly above room temperature. Skeletal rearrangement requires somewhat higher temperatures. The exact reaction conditions are determined by the individual compounds to be isomerized. For example, the isomerization of 3,3-dimethyl-1-butene to 2,3-dimethylbutene occurs at a temperature of about 100° C., while the isomerization of cyclohexene to methyl-cyclopentene requires a temperature of about 150–200° C.

*Polymerization of olefins.*—Olefinically unsaturated compounds can readily be polymerized by resin catalysts. Olefinic compounds which can be utilized are especially olefinic hydrocarbons, such as propylene, butene, isobutylene, pentene, hexene, cyclohexene, styrene, etc., and diolefins such as butadiene, isoprene, etc.

The reaction can be performed under widely different reaction conditions. A generally useful temperature range is from about 0° C. to about 250° C. or higher. The pressure can be less than atmospheric, or one can use pressures up to about 200 atmospheres or higher. The reactant may be contacted with the catalyst as a liquid or as a gas, in the presence or absence of a solvent or inert gases.

Specifically, isobutylene will polymerize to dimer, trimer and tetramer at about 0° C. either alone or in the presence of hydrocarbon diluents, at about atmospheric pressure. It also polymerizes at higher temperatures either in the gas phase or in liquid phase; for example, at about 78° C. and atmospheric pressure in the presence of liquid benzene. Furthermore, isobutylene can be selectively polymerized from a mixture with straight chain olefins such as propylene, butene-1, butene-2 ethylene, etc.

By choice of suitable reaction conditions, straight chain olefins such as propylene or butylene can be selectively polymerized from a mixture which contains ethylene.

The products of the reaction consist of liquid polymers and include the dimer, trimer and tetramer of the olefin. Depending on the reaction conditions, polymers of somewhat higher molecular weight can be obtained.

*Alkylation of aromatics.*—The sulfonated resins were found to be excellent catalysts for the alkylation of alkylatable aromatic compounds with alkylating agents.

Alkylatable aromatic compounds include in particular aromatic hydrocarbons, such as benzene, toluene, xylene, ethylbenzene, isopropylbenzene, butylbenzene, diisopropylbenzene, triisopropylbenzene, etc., polynuclear aromatic hydrocarbons, such as naphthalene.

Suitable alkylating agents are olefin-acting compounds including monoolefins, diolefins and polyolefins. The preferred alkylating agents are olefinic hydrocarbons, especially moonolefins and polyolefins. Monoolefins useful for this invention include ethylene, propylene, 1-butene, 2-butene, isobutylene, pentenes, hexenes, etc., and higher boiling olefins containing up to approximately 20 carbon atoms per molecule. Cycloolefins such as cyclopentene, cyclohexene, methylcyclopentene, etc., may also be utilized.

The alkylation reaction can be effected in the presence of the above catalyst at a temperature of from about room temperature to about 250° C. or higher, and preferably at a temperature of about 80° C. to 200° C. although the most useful temperature needed for a particular reaction will depend upon the specific reactants employed. The reaction can be carried at a pressure of about substantially atmospheric to about 100 atmospheres or more.

The molecular proportions of aromatic compound to alkylating agent can vary within wide limits and depend on the type of product desired. Higher molecular ratios of aromatic to olefin of from 4 to 1 to 20 to 1 or higher are desirable when a monoalkylated product is wanted, whereas the ratio can be 1 to 4 or 1 to 10 when polyalkylated compounds are desired.

It was found that olefins such as propylene can be very effectively utilized for the alkylation reaction, even when present in small concentration. Thus, lean propylene streams such as refinery gas can be used as a source for propylene. By use of the proper operating conditions, especially by keeping the temperature below about 180° C., it is possible to selectively utilize the propylene in the refinery gas, without reacting any ethylene which may also be present.

*Depolyalkylation.*—The depolyalkylation of aromatic hydrocarbons can be catalyzed by the above catalysts. Alkylating agents which are useful are olefins including diisobutylene, triisobutylene, propylene trimer and tetramer, etc. The reaction differs from alkylation in that the product has a molecular weight between that of the aromatic hydrocarbon charged and the sum of that of the aromatic and olefinic reactants.

The reaction conditions are similar to those applied for alkylation. By proper choice of operating conditions, "intact alkylation" can also be achieved.

*Transalkylation.*—The resin catalysts catalze transalkylation, i.e., the transfer of an alkyl radical attached to an aromatic nucleus to another aromaitc nucleus. The reaction is well known to those skilled in the art.

Suitable reactants are aromatic compounds, especially hydrocarbons, having at least one and preferentially more alkyl substituents. The group being transalkylated may be any alkyl radical although secondary and especially tertiary alkyl radicals undergo the reaction with greater ease. For example, isopropyl benzene in the presence of the above catalyst can be converted to a mixture containing benzene, diisopropylbenzene and triisopropylbenzene. This reaction may be called a disproportionation. The alkyl group can also be transferred to a different aromatic compound. For example, diisopropylbenzene and benzene may be reacted together to form isopropylbenzene; or t-butyltoluene and benzene are converted to toluene and t-butylbenzene.

The reaction conditions are similar to those used in alkylation, although longer reaction times are usually required.

*Reaction of olefins and paraffins.*—A mixture of normally gaseous olefins and paraffins is converted in the presence of the resin catalyst to valuable saturated liquid hydrocarbons in the gasoline boiling range.

Olefins useful in this reaction are especially the monoolefins such as ethylene, propylene, 1-butene, 2-butene, etc. Suitable paraffinic hydrocarbons are normal paraffins, branched paraffins, cyclic saturated hydrocarbons such as cyclohexane, alkyl substituted cyclic saturated hydrocarbons such as methylcyclopentane, methylcyclohexane, etc. Of these, the hydrocarbons containing tertiary carbon atoms are particularly useful.

It is advantageous to use a molecular ratio of paraffin to olefin of greater than 1:1, preferably of 4:1 or up to 20:1 or higher, in order to minimize undesirable side reactions.

The reaction proceeds at a temperature of from about room temperature to about 250° C., preferably at a temperature of about 80° C. to 200° C. Pressures which can be used range from atmospheric to 100 atmospheres or more, and are preferably within 3 to 30 atoms.

EXAMPLE 1

A hydrogen form sulfonated popcorn resin having an exchange capacity of 4.8 meq./g. was partially exchanged with sodium ions as follows: A 12.6 g. portion of the resin was placed in a 1-liter aqueous solution containing 37.3 g. sodium chloride (0.645 equivalents) and 68 cc. of 11.6 N hydrochloric acid (0.789 equivalents) and stirred for one hour. The resin was separated by filtration and then resuspended in the NaCl-HCl solution. This procedure was repeated twice more, contacting times being one hour for each suspension except for the last, which lasted 16 hours.

The resin was then filtered off and washed with distilled water until the washings had a pH of 7 and were free of chloride ions. The washed resin was dried at 120° C. for 17 hours. By titration, it was determined that the exchanged resin contained 2.56 meq. hydrogen ions ($H^+$) and 2.14 meq. sodium ions ($Na^+$) per gram. Thus, the ratio of $H^+/Na^+$ was 1.20, while the $H^+/Na^+$ ratio of the equilibrium solution used for exchanging was 1.22. The close agreement of the two values indicates little or no selectivity of $Na^+$ vs. $H^+$.

A 4.0 g. portion of this partially sodium exchanged resin was placed in a reaction flask containing 25 ml. anhydrous ether. The flask was cooled in an ice bath. With continuous stirring, 50 ml. of a 0.384 N solution of diazomethane in ether was added during 45 minutes at 0° C. During the methylation of the free acid groups, nitrogen was evolved. After all the diazomethane had been added, stirring was continued for 15 minutes at 0° C. and then at room temperature for one hour. At the end of that period of time the evolution of nitrogen gas had practically ceased.

The solvent containing unreacted diazomethane was removed by filtration and the resin was washed with methanol and dried at 110° C. for 16 hours. Infrared analysis showed the presence of methyl sulfonate groups. The partially methylated resin was converted to the hydrogen form with dilute hydrochloric acid, washed with distilled water until acid free, and dried. By titration it was determined that the resin contained 67% sulfonic acid groups and 33% methylsulfonated groups. The exchange capacity was 3.2 meq./g.

EXAMPLE 2

Two grams of the partially methylated, sulfonated resin catalyst produced as described in Example 1 were placed in a reaction vessel containing 50 ml. benzene. Using atmospheric pressure throughout, the contents of the reaction vessel was heated to 78° C. and maintained at that temperature. Propylene gas was bubbled in at a flow rate of 50 ml. per minute. The amount of cumene produced was determined by gas chromatography. The amount of cumene produced was computed on the basis of millimoles cumene per hour both per gram of catalyst and per 5 meq. hydrogen ion. Results are set forth in Table II.

EXAMPLE 3

For comparison the run of Example 2 was repeated using the initial sulfonated popcorn resin catalyst (100% $H^+$; 4.8 meq. $H^+$/g.), instead of that of Example 1. Results are set forth in Table II.

Table II

| Example | Functional Groups | Alkylation Rate, millimoles Cumene per Hour | |
|---|---|---|---|
| | | Per g. | Per 5 meq. $H^+$ |
| 2 | 67%—$SO_3H$<br>33%—$SO_3CH_3$ | 8.0 | 12.7 |
| 3 | 100%—$SO_3H$ | 5.1 | 5.3 |

From the data in Table II, it will be noted that the partially methylated catalyst (Example 2) is 1.6 times more active on a weight basis and 2.3 times more active per unit acid group than the 100% acid form catalyst (Example 3). Thus, the methylsulfonate moieties have a definite promoting effect on the activity and availability of the remaining acid sites.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A hydrogen form, porous sulfonated polystyrene resin catalyst having between about 10 percent and about 80 percent of the hydroxyl groups on the sulfonic acid groups replaced with a non-polar group.
2. A hydrogen form sulfonated popcorn polystyrene resin catalyst having between about 10 percent and about 50 percent of the hydroxyl groups of the sulfonic acid groups replaced with a non-polar group.
3. A hydrogen form sulfonated popcorn polystyrene resin catalyst having between 10 percent and about 50 percent of the hydroxyl groups on the sulfonic acid groups replaced with a lower alkoxy group.
4. Anhydrous hydrocarbon conversion reactions involving olefins that are carried out in the presence of the catalysts defined in claim 1.
5. In the catalytic alkylation of alkylatable aromatic compounds with olefin-acting compounds, the improvement that comprises carrying out said alkylation in the presence of a catalyst defined in claim 2.
6. In the catalytic alkylation of benzene with propylene, the improvement that comprises carrying out said alkylation in the presence of a catalyst defined in claim 3.

References Cited

UNITED STATES PATENTS

| | | | |
|---|---|---|---|
| 2,898,311 | 8/1959 | Tsunda | 260—79.3 |
| 3,037,052 | 5/1962 | Bortnick | 260—683.15 |
| 3,153,001 | 10/1964 | Apel | 260—2.2 |

JOSEPH L. SCHOFER, *Primary Examiner.*

M. L. BERCH, D. K. DENENBERG,
*Assistant Examiners.*